United States Patent [19]

Yoshikawa et al.

[11] Patent Number: 4,746,251

[45] Date of Patent: May 24, 1988

[54] METHOD OF DIGITIZING A PROFILE LOCUS

[75] Inventors: Hirofumi Yoshikawa; Yuso Matsunaga, both of Hiroshima, Japan

[73] Assignee: Mitsubishi Jukogyo Kabushiki Kaisha, Japan

[21] Appl. No.: 821,707

[22] Filed: Jan. 23, 1986

[30] Foreign Application Priority Data

May 24, 1985 [JP] Japan .................................. 60-110160

[51] Int. Cl.[4] ...................... B23Q 35/14; G05B 19/18
[52] U.S. Cl. ...................................... 409/84; 318/578; 364/474; 409/99
[58] Field of Search ................ 364/474, 520; 318/578; 409/84, 85, 116, 117, 125, 130, 99

[56] References Cited

U.S. PATENT DOCUMENTS

| | | | |
|---|---|---|---|
| 3,707,662 | 12/1972 | Hoffman | 318/578 |
| 4,296,473 | 10/1981 | Imazeki et al. | 318/578 |
| 4,394,608 | 7/1983 | Tryber et al. | 318/578 |

FOREIGN PATENT DOCUMENTS 134887  10/1979  Japan .................................. 318/578

*Primary Examiner*—Z. R. Bilinsky
*Attorney, Agent, or Firm*—Toren, McGeady & Associates

[57] ABSTRACT

In a profiling method constructed so that NC working is performed on the basis of profile locus data obtained by profiling a shape of a model by a profiling machine, a digitized method of the profile locus is characterized in that position data of the model surface, obtained by adding a position of the profiling machine and a displacement signal from a tracer head at each sampling time, are rounded through a low-pass filter upon a profiling operation, and a time constant of the filter is automatically changed in response to the rate of change of the shape of the model. According to this method, fluctuation of the profiling machine, which can not be corrected by the filter heretofore and is an error as it is, is corrected, and a stylus displacement signal, delayed as compared with a response of a profiling machine position signal upon high speed profiling operation, is greatly improved so that high speed profiling operation can be attained.

5 Claims, 2 Drawing Sheets

4,746,251

METHOD OF DIGITIZING A PROFILE LOCUS

BACKGROUND OF THE INVENTION (i) Field of the Invention

The present invention relates to a method of digitizing a locus data in a profiling method, and apparatus constructed so that so model shape is converted to an NC block data train, which is an approximate locus, by a profiling machine and the data is used to perform NC working by a working machine.

(ii) Prior Art Statement

Generally, the digitizing operation in the above apparatus is linearly approximated with a certain tolerance and when the tolerance is exceeded, the block data is cut out. By repeating this procedure, the block data train approximating surface position of a model has been obtained.

In order to attain profiling working with high accuracy heretofore in the above method, when the tolerance is set to a small value such as 0.01 mm, it is disadvantageous that the block data is numerous. When a shape of a model is complicated or when a surface of a model is rough, the number of the block data is necessarily increased. However, another large cause is overlap of noise-like variation component to dot-train data. This contains fluctuation of about several microns of a position detection system of the profiling machine and a noise component contained in a displacement signal of a tracer head. Adding the fluctuation and the component, they exceed the tolerance in the worst case and the digitizing operation with high accuracy can not be attained. A known low-pass filter is used to remove the fluctuation component and particularly there are many examples in which application is made to the displacement signal of the tracer head. In order to obtain the surface position of the model exactly, it is necessary to sample a machine position signal and the displacement signal of the tracer head at the same time and add them. However, a delay time of the low-pass filter causes an error in a calculation position of the model surface. This becomes a problem particularly upon the high speed profiling operation.

In this manner, the prior art working operation using the digitizing operation is considered that slightly rough tolerance is used or numerous block data is indispensable if tolerance is set strictly. However, requirement of high accuracy in the profiling working is recently enhanced increasingly and the digitizing method with high accuracy is now desired. However, there is no effective method heretofore.

SUMMARY OF THE INVENTION

The present invention has been made in view of the above problems and an object of the present invention is to provide a method of digitizing a profiling locus in which profiling operation with high accuracy can be attained.

In order to achieve the object, according to the present invention, the profiling method for performing NC working on the basis of profile locus data obtained by profiling a model by a profiling machine is characterized by rounding position data of model surface obtained by adding a profiling machine position and a displacement signal of a stylus from a tracer head at each sampling time upon profiling operation by means of a low-pass filter and momentarily changing a time constant of the filter in response to degree of variation of a shape of the model obtained from a differential value of the displacement signal automatically.

When the model shape is suddenly changed, the time constant of the low-pass filter is made small so that exact profiling is attained.

The present invention comprises the above structure and hence possesses the following effects.

Influence of the fluctuation of the profiling machine, which is not corrected by the above low-pass filter heretofore and is an error as it is, is corrected and the fact that high speed profiling operation can not be made due to delay of the stylus displacement signal as compared with a response of a machine position signal upon high speed profiling operation can be improved greatly.

DETAILED DESCRIPTION OF A PREFERRED EMBODIMENT

Figure 1:
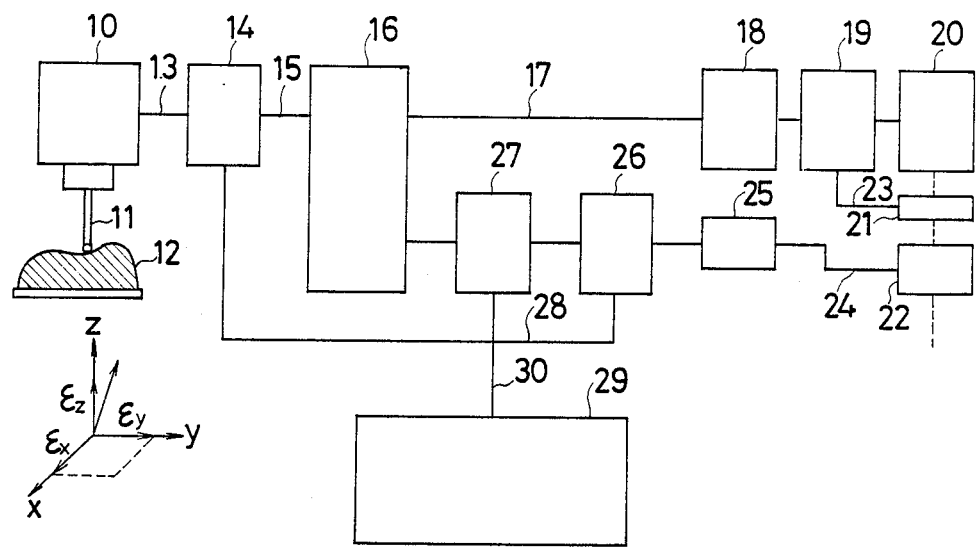
FIG. 1 is a block diagram showing an embodiment of the present invention.

An embodiment of the present invention is now described with reference to the drawings. FIG. 1 is a block diagram showing a construction of an embodiment. In FIG. 1, numeral 10 denotes a tracer head, 11 a stylus of a profiling detector, 12 a model, 13 displacement signals (for three axes) of the stylus 11, 14 a processing unit for the displacement signals, such as, for example, an A/D converter, 15 processed displacement signals of the stylus 11 (for three axes), 16 a profiling speed controlling unit, 17 a profiling speed command signal, 18 a digital-to-analog converter, 19 a servo-amplifier, 20 a drive motor for the profiling machine, 21 a speed detector, 22 a machine position detector, 23 a speed feedback signal, 24 a position detection signal, 25 a machine position counter, 26 an arithmetic operation unit for a central position of the stylus 11, 27 a profiling data processing unit, 28 a tracer position signal, 29 a model shape data receiving unit such as, for example, a memory medium or a working machine, and 30 the model shape data supplied to the working machine. In the figure, a signal or a unit for only one axis is depicted concerning the servo system, although signals or units for three axes are required.

Operation of the embodiment of the present invention is now described. In FIG. 1, the stylus detection signal 13 is supplied to the displacement signal processing unit 14 to be converted from an analog signal into a digital signal which is applied to the profiling speed controlling unit 16 as the stylus detection signal 15. The profiling speed controlling unit 16 forms a loop by the stylus detection signal 15 and the profiling speed command signal 17, which is an operation signal, and operates so that the stylus 11 follows along the surface of the model exactly. More particularly, a speed command is applied to motors for respective axes so that a normal vector $\epsilon = \sqrt{\epsilon_x^2 + \epsilon_y^2 + \epsilon_z^2}$ indicating the model shape, which is obtained from displacements ($\epsilon_x, \epsilon_y, \epsilon_z$) for three axes of the stylus, is maintained to a constant value. In the same manner, the position detection signal 24 from the machine position detector 22 is integrated by the machine position counter 25 to be supplied to the arithmetic operation unit 26 for the central position of the stylus 11. The arithmetic operation unit 26 adds the machine position (X, Y, Z) and the displacements ($\epsilon_x$, $\epsilon_y$, $\epsilon_z$) of the stylus 11 and supplies the added value to the profiling data processing unit 27 as profiling data (X+$\epsilon_x$, Y+$\epsilon_y$, Z+$\epsilon_z$). After the data is corrected through an electric filter to f(X+$\epsilon_x$), f(Y+$\epsilon_y$) and f(Z+$\epsilon_z$), the corrected data is digitized and the exact central position of the stylus 11 can be obtained.

Figure 2:
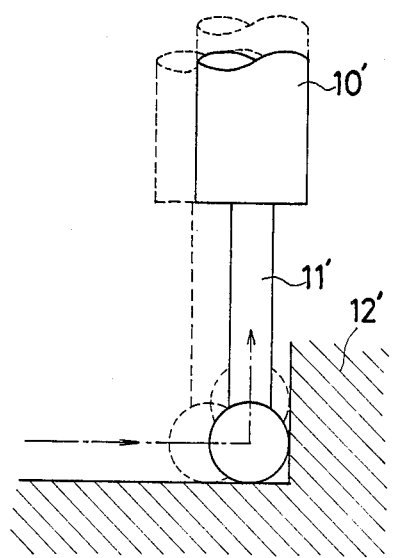
FIG. 2 schematically illustrates a shape of a model which is suddenly changed.
Figure 3:
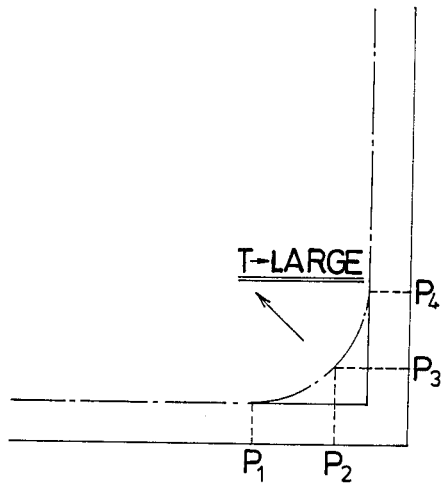
FIG. 3 is a characteristic diagram showing distortion of profiling locus data.

Operation is now described when a machine displacement signal and the stylus displacement signal are suddenly changed at a suddenly changing portion of the model shape. FIG. 2 shows movement of the tracer head at the suddenly changing portion of the model shape. Numeral 10' denotes the tracer head, 11' the stylus and 12' the model. The profiling locus data at such a suddenly changing portion of the model shape has distortion or rounded corner as shown by a dash-and-dot line of FIG. 3. In the figure, P1 represents a starting point of the rounded corner, P2 and P3 represent maximum points of error due to the rounded corner and P4 represents a terminating point of the rounded corner.

Figure 4:
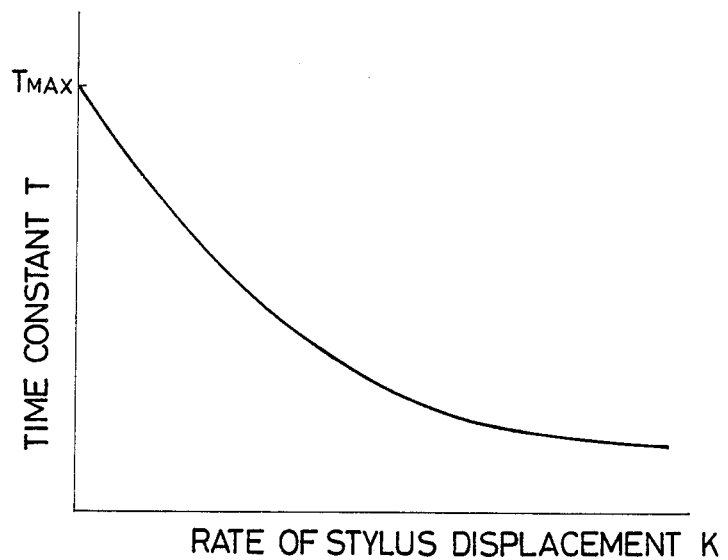
FIG. 4 is a characteristic diagram showing time constant versus rate of stylus displacement.

Accordingly, it is possible to obtain an exact central portion of the stylus even at the suddenly changing portion of the model, by automatically changing the time constant T of the electric filter of the profiling data processing unit 27, so as to be reduced gradually as the rate of change $K=|\dot\epsilon_x|+|\dot\epsilon_y|+|\dot\epsilon_z|$ of the displacement ($\epsilon_x$, $\epsilon_y$, $\epsilon_z$) of the stylus is increased, as shown in FIG. 4. Further, a similar operation is also obtainable even when $K=|\dot\epsilon|$ is replaced by the normal vector $\epsilon=\sqrt{\epsilon_x^2+\epsilon_y^2+\epsilon_z^2}$ of the stylus displacement.

According to such a manner, the disadvantageous distortion, produced in case of manually correcting the time constant T of the electric filter heretofore in the displacement signal processing unit, can be suppressed and the high speed profiling operation can be attained.

We claim:

1. In a profiling method for performing NC working on the basis of locus data obtained by profiling a shape of a model by a stylus in a profiling machine, a method of digitizing profile locus data comprising steps of: rounding position data of a surface of the model, obtained by adding a position signal of the profiling machine and a displacement signal from a tracer head, at each sampling time upon profiling operation by means of a low-pass filter having a changeable time constant; and automatically changing the time constant of said filter in response to a rate of change of the shape of the model, wherein the time constant of said filter is decreased when the rate of change of the shape of the model increases.

2. A method according to claim 1, wherein the rate of change of the shape of the model is determined by the relation $$K=|\dot\epsilon_x|+|\dot\epsilon_y|+|\dot\epsilon_z|,$$

in which K is the rate of change, and ($\epsilon_x$, $\epsilon_y$, $\epsilon_z$) is the displacement of the stylus.

3. A method according to claim 1, wherein the rate of change of the shape of the model is determined by the relation $$K=|\dot\epsilon| \text{ and}$$

$$\epsilon=\sqrt{\epsilon_x^2+\epsilon_y^2+\epsilon_z^2},$$

in which K is the rate of change, and ($\epsilon_x$, $\epsilon_y$, $\epsilon_z$) is the displacement of the stylus, and $\epsilon$ is a normal vector of the displacement.

4. In a profiling method for performing NC working on the basis of locus data obtained by profiling a shape of a model by a stylus of a profiling machine, a method of digitizing profiling locus data comprising the steps:

(a) detecting displacement of the stylus by stylus detection means and generating digitized stylus detection signals ($\epsilon_x$, $\epsilon_y$, $\epsilon_z$);

(b) producing profiling speed command signals, for driving respective drive motors corresponding to three axes of the profiling machine in response to the stylus detection signals on the basis of central position signals of the stylus from a profiling data processing unit, by a profiling speed controlling unit;

(c) detecting drive positions of the drive motors by position detection means to produce drive position signals;

(d) adding the drive position signals (X, Y, Z,) for the three axes to the stylus detection signals ($\epsilon_x$, $\epsilon_y$, $\epsilon_z$) of the stylus displacement detecting means by an arithmetic operation unit for a central position of the stylus, to produce profiling data signal; and (e) passing the profiling data signal through an electric filter in the profiling data processing unit to apply a time constant, defined by a rate of change of the displacement ($\epsilon_x$, $\epsilon_y$, $\epsilon_z$) of the stylus according to the relation $K=|\dot\epsilon_x|+|\dot\epsilon_y|+|\dot\epsilon_z|$, in which K is the rate of change, to the profiling data signal, wherein the time constant of the electric filter in the profiling data processing unit is automatically made smaller as the rate of change K of the displacement of the stylus increases, and producing the central position signal of the stylus to the profiling speed controlling unit.

5. A method according to claim 4, wherein the time constant of the electric filter in the profiling data processing unit is automatically made smaller as the rate of change K of a normal vector $\epsilon$ of the displacement of the stylus increases, wherein $$K=|\dot\epsilon| \text{ and}$$

$$\epsilon=\epsilon_x^2+\epsilon_y^2+\epsilon_z^2.$$

* * * * *